(12) United States Patent
McKenney (10) Patent No.: US 7,430,627 B2
(45) Date of Patent: *Sep. 30, 2008

(54) ADAPTIVE READER-WRITER LOCK

(75) Inventor: Paul E. McKenney, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 518 days.

This patent is subject to a terminal disclaimer.

(21) Appl. No.: 11/059,921

(22) Filed: Feb. 17, 2005

(65) Prior Publication Data

US 2005/0149634 A1 Jul. 7, 2005

Related U.S. Application Data (63) Continuation-in-part of application No. 10/731,454, filed on Dec. 9, 2003, now Pat. No. 7,191,272, which is a continuation of application No. 09/741,679, filed on Dec. 19, 2000, now Pat. No. 6,678,772.

(51) Int. Cl.
*G06F 12/00* (2006.01)
*G06F 9/52* (2006.01)

(52) U.S. Cl. ........................ 710/200; 718/107

(58) Field of Classification Search ............ 707/8; 709/229; 718/104, 107; 710/200
See application file for complete search history.

(56) References Cited

U.S. PATENT DOCUMENTS

| | | | |
|---|---|---|---|
| 5,287,521 A | 2/1994 | Nitta et al. ............. 710/200 |
| 5,442,758 A | 8/1995 | Slingwine et al. ........ 395/375 |
| 5,596,754 A | 1/1997 | Lomet .................. 710/200 |
| 5,608,893 A | 3/1997 | Slingwine et al. ........ 395/468 |
| 5,615,373 A * | 3/1997 | Ho .................... 710/200 |
| 5,727,209 A | 3/1998 | Slingwine et al. ........ 395/672 |
| 5,737,611 A | 4/1998 | Vicik .................. 710/200 |

(Continued)

OTHER PUBLICATIONS

McKenney, P. Proceeding of IASTED International Conference Parallel and Distributed Computing and System, "Practical Performance Estimation On Shared-Memory Multiprocessors", Nov. 3-6, 1999.

Lim et al., "Reactive Synchronization Algorithms For Multiprocessors", Jun. 1995.

*Primary Examiner*—Glenn A. Auve
*Assistant Examiner*—Trisha Vu
(74) *Attorney, Agent, or Firm*—Lieberman & Brandsdorfer, LLC (57) ABSTRACT

A method and computer system for dynamically selecting an optimal synchronization mechanism for a data structure in a multiprocessor environment. The method determines a quantity of read-side and write-side acquisitions, and evaluates the data to determine an optimal mode for efficiently operating the computer system while maintaining reduced overhead. The method incorporates data received from the individual units within a central processing system, the quantity of write-side acquisitions in the system, and data which has been subject to secondary measures, such as formatives of digital filters. The data subject to secondary measures includes, but is not limited to, a quantity of read-side acquisitions, a quantity of write-side acquisitions, and a quantity of read-hold durations. Based upon the individual unit data and the system-wide data, including the secondary measures, the operating system may select the most efficient synchronization mechanism from among the mechanisms available. Accordingly, efficiency of a computer system may be enhanced with the ability to selectively choose an optimal synchronization mechanism based upon selected and calculated parameters.

17 Claims, 5 Drawing Sheets

State Diagram of Adaptive Reader-Writer Lock

U.S. PATENT DOCUMENTS

| | | | |
|---|---|---|---|
| 5,761,659 A | 6/1998 | Bertoni | 707/8 |
| 5,838,912 A | 11/1998 | Poon et al. | 709/204 |
| 5,872,981 A | 2/1999 | Waddington et al. | 710/200 |
| 5,960,194 A | 9/1999 | Choy et al. | 707/102 |
| 5,983,225 A | 11/1999 | Anfindsen | 707/8 |
| 6,405,274 B1 | 6/2002 | Chan | 710/200 |
| 6,546,443 B1 | 4/2003 | Kakivaya et al. | 710/200 |
| 6,678,772 B2 * | 1/2004 | McKenney | 710/200 |
| 7,191,272 B2 * | 3/2007 | McKenney | 710/200 |

* cited by examiner

ADAPTIVE READER-WRITER LOCK

CROSS REFERENCE TO RELATED APPLICATION(S)

The present application is a continuation-in-part of U.S. patent application Ser. No. 10/731,454, filed Dec. 9, 2003 now U.S. Pat. No. 7,191,272, which is a continuation of U.S. patent application Ser. No. 09/741,679, filed Dec. 19, 2000 now U.S. Pat. No. 6,678,772.

BACKGROUND OF THE INVENTION

1. Technical Field

This invention relates to selecting an optimal resource locking mechanism in computer systems and more specifically to a method of dynamically selecting an optimal lock mode. Both units within a central processing system and system-wide measurements are maintained, and based upon these measures an optimal locking mode or non-locking mode is determined.

2. Description of the Prior Art

Multiprocessor systems contain multiple processors (also referred to herein as CPUs) that can execute multiple processes or multiple threads within a single process simultaneously in a manner known as parallel computing. In general, multiprocessor systems execute multiple processes or threads faster than conventional single processor systems, such as personal computer, that execute programs sequentially. The actual performance advantage is a function of a number of factors, including the degree to which parts of a multithreaded process and/or multiple distinct processes can be executed in parallel and the architecture of the particular multiprocessor system. The degree to which processes can be executed in parallel depends, in part, on the extent to which they compete for exclusive access to shared memory resources.

Shared memory multiprocessor systems offer a common physical memory address space that all processors can access. Multiple processes therein, or multiple threads within a process, can communicate through shared variables in memory which allow the processes to read or write to the same memory location in the computer system. Message passing multiprocessor systems, in contrast to shared memory systems, have a separate memory space for each processor. They require processes to communicate through explicit messages to each other.

The architecture of shared memory multiprocessor systems may be classified by how memory is physically organized. In distributed shared memory (DSM) machines, the memory is divided into modules physically placed near one or more processors, typically on a processor node. Although all of the memory modules are globally accessible, a processor can access local memory on its node faster than remote memory on other nodes. Because the memory access time differs based on memory locations, such systems are also called non-uniform memory access (NUMA) machines. In centralized shared memory machines, the memory is physically in one location. Centralized shared memory computers are called uniform memory access (UMA) machines because the memory is equidistant in time from each of the processors. Both forms of memory organization typically use high-speed cache in conjunction with main memory to reduce execution time.

The use of NUMA architecture to increase performance is not restricted to NUMA machines. A subset of processors in a UMA machine may share a cache. In such an arrangement, even though the memory is equidistant from all processors, data can circulate among the cache-sharing processors faster (i.e., with lower latency) than among the other processors in the machine. Algorithms that enhance the performance of NUMA machines can be applied to any multiprocessor system that has a subset of processors with lower latencies. These include not only the noted NUMA and shared cache machines, but also machines where multiple processors share a set of bus-interface logic as well as machines with interconnects that "fan out" (typically in hierarchical fashion) to the processors.

A significant issue in the design of multiprocessor systems is process synchronization. The degree to which processes can be executed in parallel depends in part on the extent to which they compete for exclusive access to shared memory resources. For example, if two processes A and B are executing in parallel, process B might have to wait for process A to write a value to a buffer before process B can access it. Otherwise, a race condition could occur, where process B might access the buffer while process A was part way through updating the buffer. To avoid conflicts, process synchronization mechanisms are provided to control the order of process execution. These mechanisms include mutual exclusion locks, condition variables, counting semaphores, and reader-writer locks. A mutual exclusion lock allows only the processor holding the lock to execute an associated action. When a processor requests a mutual exclusion lock, it is granted to that processor exclusively. Other processors desiring the lock must wait until the processor with the lock releases it. To address the buffer scenario described above, both processes would request the mutual exclusion lock before executing further. Whichever process first acquires the lock then updates (in the case of process A) or accesses (in the case of process B) the buffer. The other processor must wait until the first processor finishes and releases the lock. In this way, the lock guarantees that process B sees consistent information, even if processors running in parallel execute processes A and B.

For processes to be synchronized, instructions requiring exclusive access can be grouped into a critical section and associated with a lock. When a process is executing instructions in its critical section, a mutual exclusion lock guarantees no other processes are executing the same instructions. This is important where processes are attempting to change data. However, such a lock has the drawback in that it prohibits multiple processes from simultaneously executing instructions that only allow the processes to read data. A reader-writer lock, in contrast, allows multiple reading processes ("readers") to access simultaneously a shared resource such as a database, while a writing process ("writer") must have exclusive access to the database before performing any updates for consistency. A practical example of a situation appropriate for a reader-writer lock is a TCP/IP routing structure with many readers and an occasional update of the information. Recent implementations of reader-writer locks are described by Mellor-Crummey and Scott (MCS) in "Scalable Reader-Writer Synchronization for Shared-Memory Multiprocessors," *Proceedings of the Third ACM SIGPLAN Symposium on Principles and Practices of Parallel Programming*, pages 106-113 (1991) and by Hseih and Weihl in "Scalable Reader-Writer Locks for Parallel Systems", *Technical Report MIT/LCS/TR*-521 (November 1991).

The basic mechanics and structure of reader-writer locks are well known. In a typical lock, multiple readers may acquire the lock, but only if there are no active writers. Conversely, a writer may acquire the lock only if there are no active readers or another writer. When a reader releases the lock, it takes no action unless it is the last active reader; if so, it grants the lock to the next waiting writer. A centralized reader-writer lock mode is a formative of a reader-writer lock that uses a single data structure to control access to the lock. There are many implementations of this locking primitive. One of the simplest formative uses a set of counters guarded by a simple test-and-set spinlock. The counters count the number of readers holding the lock, the number of readers waiting for access to the lock, the number of writers holding the lock (which must be either one or zero), and the number of writers waiting on the lock. The readers and writers go through a decision process based upon the counter values. Accordingly, this mode is optimal for high update rates wherein read side critical sections are lengthy. The simple test and set lock is a form of an exclusive lock. Other types of exclusive locks include test and set; test and test and set; queued lock; ticket lock; and quad aware lock.

A drawback of prior reader-writer locks is undesired memory contention, whereby multiple processors modify a single data structure in quick succession, possibly while other processors are spinning on said single data structure. The resulting cache misses can severely degrade performance. The drawback has been partially addressed in more recent locking schemes such as the ones described by Hseih and Weihl. Their static locking algorithm allocates one semaphore per processor, stored in memory local to the processor. An additional semaphore acts as a gate on the writers. To acquire a static lock, a reader need only acquire its local semaphore, greatly reducing the amount of spinning. However, a writer must still acquire all of the semaphores of which there is now one for each processor, and the additional semaphore. When releasing a static lock, a reader simply releases its local semaphore, and a writer releases all of the semaphores. The lock thus offers an improvement over prior locks in that the readers do not interfere with each other and readers do not have to go over the system interconnect to acquire a lock. However, the fact that readers never interfere means that writers must do a substantial amount of work in systems with many processors. When even a few percent of the requests are writes, the throughput suffers dramatically because a writer must acquire a semaphore for every processor on every node to successfully acquire the lock. To overcome this problem, their dynamic locking scheme attempts to reduce the number of semaphores a writer must acquire by keeping track of active readers in a single memory location and acquiring only semaphores associated with these readers. The scheme uses a variety of mutual exclusion locks to accomplish this.

"Reactive Synchronization Algorithms for Multiprocessor" by Beng-Hong Lim et al. describes an adaptive exclusive lock which teaches the performance benefits of selecting synchronization protocols in response to the level of contention. The disclosure teaches switching between a simple test-and-set spinlock and a queued lock, both of which are exclusive locks. Beng-Hong Lim et al. teach dynamically switching to simple test and set spinlock at low contention and to queued lock at high contention, thereby using each of these locking modes when it operates most effectively. However, Ben-Hong Lim et al. does not teach a method of dynamically selecting a locking mode wherein different modes may be beneficial for differing ratios of read and write requests.

In addition to selecting a lock mode, read-copy-update (RCU) mechanism may be employed to defer destruction of elements removed from a protected data structure, or a similar data organization element, until a concurrently executing read-only access to the data structure has completed an ongoing traversal of that data structure. The process for deferment of destruction of elements removed from the data structure permits lock free read-only access without incurring memory corruption and invalid pointer failures.

Figure 1:
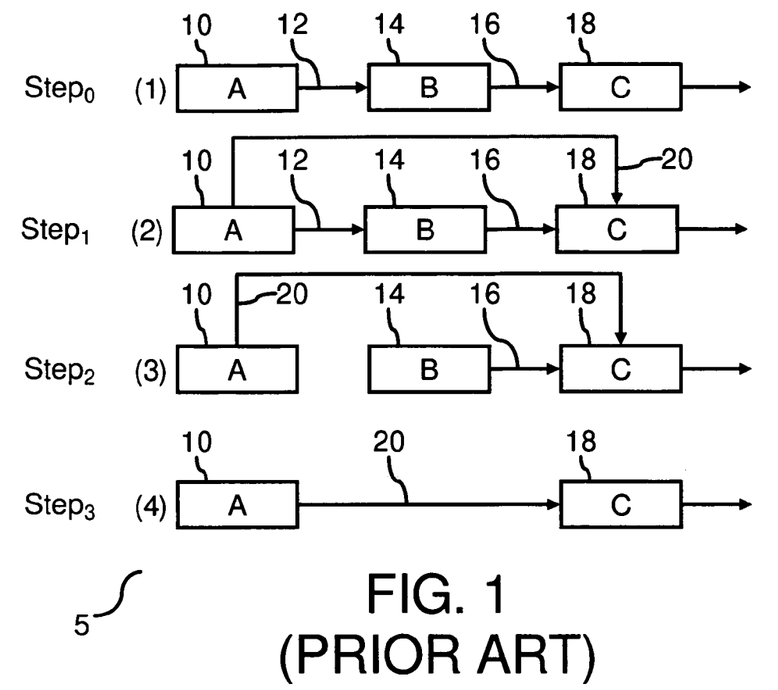
FIG. 1 is a block diagram of a prior art RCU operation.

FIG. 1 is a prior art diagram (5) illustrating the RCU mechanism for removing an element from a data structure. In this example, element B (14) is being deleted from a data structure that contains elements A (10), B (14), and C (18), in that order. Initially, at $Step_0$, the data structure is linked such that element A (10) includes a first pointer (12) to element B (14), and element B (14) includes a second pointer (16) to element C (18). The first step, $Step_1$, in removing element B (14) from the data structure using the RCU mechanism, is to move the first pointer (12) that originally extended from element A (10) to element B (12) to extend from element A (10) to element C (18). In FIG. 1, the movement of the first pointer (12) is shown as a third pointer (20). However, technically, the third pointer (20) is the same as the first pointer (12) assigned to extend to and designate a different element in the data structure. Pointers (12) and (20) cannot be present at the same time, however, readers currently referencing element C (18) may have arrived at element C (18) either using the old value of the first pointer (12) or the new value of the third pointer (20). Therefore, first pointer (12) and third pointer (20) represent different values for the same pointer. Any readers traversing this data structure concurrently with the deletion at $Step_1$, continue to be directed to either element B (14) or element C (18) in the data structure. Once a grace period has elapsed, there will not be any readers referencing element B (14) since the path provided in $Step_0$ by the first pointer (12) to element B (14) has been removed, as shown in $Step_2$. Following the grace period, element B (14) may now be freed from memory, as shown in $Step_3$. In this way, RCU defers freeing of elements removed from an RCU protected data structure until concurrently executing read actions have completed any ongoing traversals of that data structure.

Figure 2:
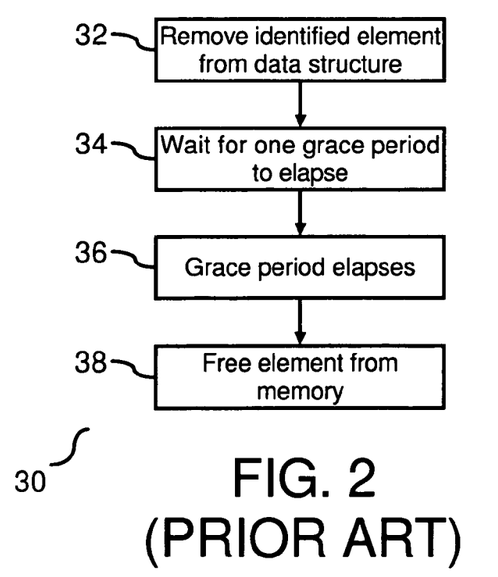
FIG. 2 is a flow chart of a prior art synchronize_kernel primitive.

With respect to RCU, there are two primitives that determine how long element B (14), from FIG. 1, must be retained in the data structure prior to removal therefrom. One of the primitives is known as synchronize_kernel, which cannot be called from an interrupt handler or within a spin lock. The synchronize_kernel primitive blocks a caller's subsequent execution by waiting until the end of a subsequent grace period, i.e. until current readers accessing data structure have completed that traversal. FIG. 2 is a flow chart (30) of a prior art use of this synchronize_kernel primitive showing removal of an element from a data structure and freeing the element from memory. The first step involves removal of an element from the data structure (32). Following removal of the element, the synchronize_kernel primitive is invoked in order to wait for one grace period to elapse (34). Once the grace period elapses (36), the synchronize_kernel primitive returns to its caller. This caller can then free (38) the element designated for removal from the data structure at step (32). Accordingly, the synchronize_kernel primitive is one mechanism for efficient access by readers to the data structure.

Figure 3:
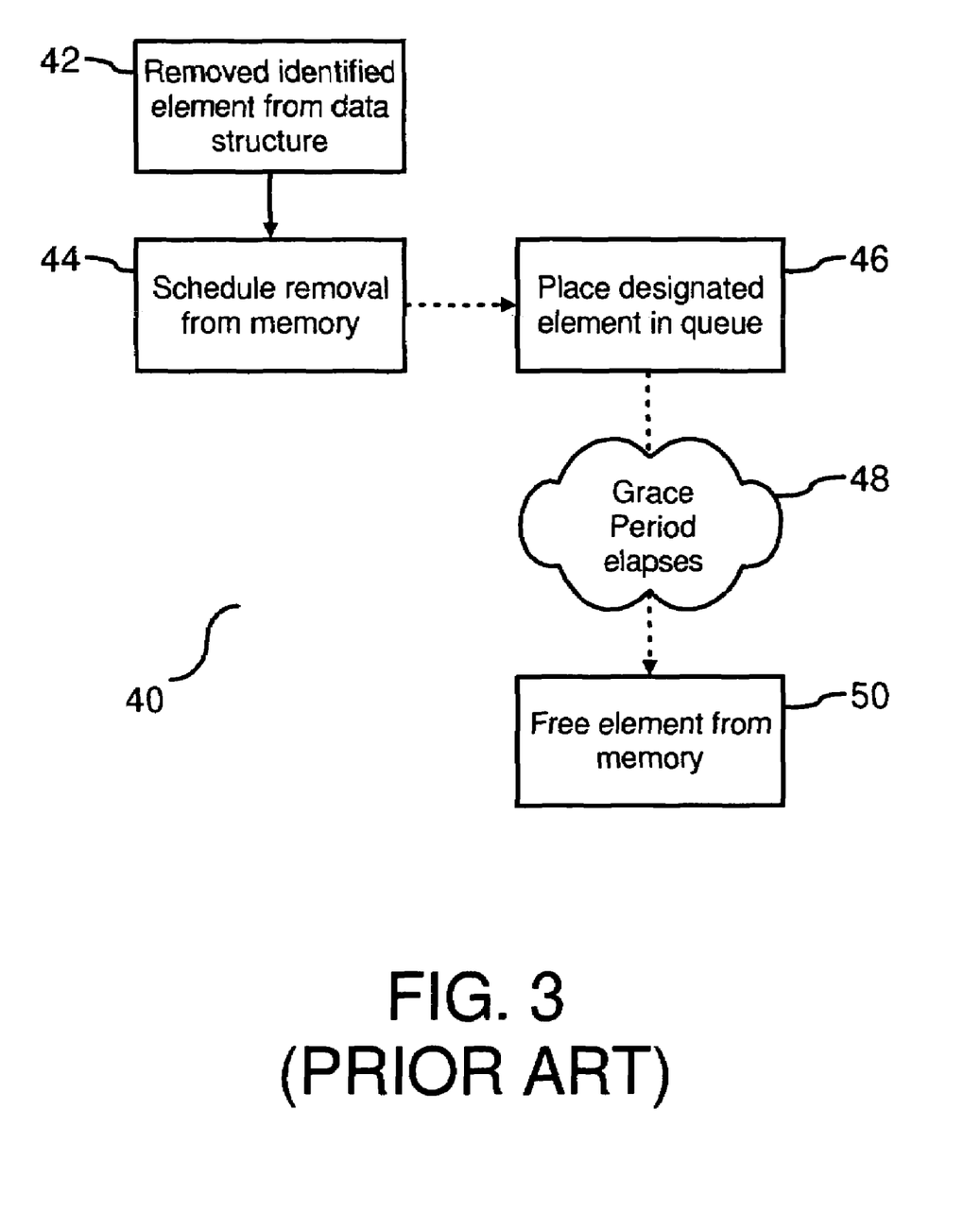
FIG. 3 is a flow chart of a prior art call_rcu primitive.

The second primitive is the call_rcu primitive. This primitive supports efficient removal of an element from a data structure without requiring a context switch, wherein a context switch supports changing among concurrently operating processes in a multitasking environment. The call_rcu primitive registers the function that is freeing the element designated for removal from the data structure. FIG. 3 is a flow chart (40) of a prior art use of the call_rcu primitive for removal of an element from a data structure and freeing the element from memory. The first step involves removal of an element from the data structure (42). Following removal of the element at step (42) through use of the call_rcu primitive, the element is then scheduled for removal from memory following a grace period (44). In practice, the call₁₃rcu primitive places the element designated for removal from the data structure into a queue for removal at a later time (46). Following elapse of a grace period (48), the element in the queue is freed from memory (50). Accordingly, the call₁₃rcu primitive provides an alternative mechanism for efficient removal of an element from a data structure and memory.

Depending upon the situation, one of the primitives, i.e. call_rcu or synchronize_kernel, may be more desirable. Since CPUs are not allowed to switch context while traversing an RCU protected data structure, once all CPUs have been observed performing at least one context switch it is safe to free any elements from memory that were previously removed from their corresponding data structure. When operating in the RCU mode, only writers need acquire locks, as readers may proceed without locking. Accordingly, writers must defer destruction of a removed element using the call₁₃rcu or synchronize_kernel primitives, thereby preventing updates made by writers from interfering with concurrent readers.

Locking requires use of atomic instructions and cache transfers, which are expensive when compared to instructions that do not require locking. For data structures that are infrequently changed, there is motivation to avoid locking. Accordingly, there is a need for a computer system comprising multiple processors, means for determining an optimal locking mode or non-locking mode, and means for switching among the locking or non-locking modes based upon the determination.

SUMMARY OF THE INVENTION

It is therefore an object of the invention to provide a method of dynamically selecting a data structure synchronization mechanism in a multiprocessor computer system. It is a further object of the invention to switch among locking modes or RCU based upon system parameters and measurements to provide an efficient operating mode.

In one aspect of the invention a method is provided for dynamically determining a synchronization mechanism in a multiprocessor computer system. First and second system-wide measures of read and write acquisitions are maintained. A manager is implemented to select an optimal mechanism based upon at least some of these measures. The mechanism is preferably, but not necessarily, selected from the group consist of: a distributed reader-writer lock, a centralized reader-writer lock, an exclusive lock, and RCU.

In another aspect of the invention a multiprocessor computer system is provided to include first and second system-wide measures of read and write acquisitions. A manager is implemented to select an optimal synchronization mechanism, responsive to at least some of those measures. The synchronization mechanism is preferably, but not necessarily, selected from the group consisting of: a distributed reader-writer lock, a centralized reader-writer lock- an exclusive lock, and RCU.

In yet another aspect of the invention an article in a multiprocessor system is provided comprising a computer-readable signal bearing medium. The article includes means for maintaining first and second system-wide measures of read and write acquisitions. In addition, means in the medium are provided for selecting a synchronization mechanism based upon some of the measures. The synchronization mechanism is preferably, but not necessarily, selected from the group consist of: a distributed reader-writer lock, a centralized reader-writer lock, an exclusive lock, and RCU.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

Maintaining low lock contention is essential to attaining high performance in parallel programs. However, even programs with negligible lock contention can suffer severe performance degradation due to memory latencies incurred when accessing shared data that is frequently modified. This is due to the high cost of memory latency compared to instruction execution overheads. Memory latencies are incurred for shared data structures in addition to the locks themselves. Accordingly, it is desirable and efficient to operate in different locking modes under differing levels of operation.

Technical Details

It has been ascertained that there are essentially three desirable forms of locking modes or primitives that provide efficient modes of operation for differing levels of contention, two formations of a reader-writer lock mode, and one form of an exclusive lock. Although there are many locking primitives which have been developed and maintained, these three primitives provide efficient forms of locks that address issues with high performance in parallel programs. In general, a reader-writer lock is a lock that has a reader mode and a writer mode. Multiple readers can hold the lock simultaneously, but only a single writer is allowed to hold the lock at a given time. As such, readers exclude writers, writers exclude readers, and writers exclude writers. The two forms of reader-writer locks employed within the dynamic lock primitive of the preferred embodiment are a distributed reader-writer spinlock and a centralized reader-writer lock. In addition, a simple test-and-set spinlock is incorporated as an alternative locking primitive. Although the test-and-set spinlock is not a reader-writer lock, it may typically be used where one would use a reader-writer lock, giving up the ability for readers to execute in parallel. Accordingly, although the dynamic lock primitive is taught herein with specific lock modes, alternative lock modes may be employed where and when desirable.

A distributed reader-writer spinlock is constructed by maintaining a separate simple spinlock per CPU, and an additional simple spinlock to serialize write-side accesses. Each of these locks is in its own cache line in order to prevent false sharing. To read-acquire the distributed reader-writer spinlock, the readers acquire the lock corresponding to their CPU. To read release a distributed reader-writer spinlock, a CPU releases its lock. To write acquire the distributed reader-writer spinlock, a CPU first acquires the writer gate, then each of the CPU's spinlocks. To write-release the lock, the per-CPU locks are released, and then the writer gate is released. The distributed reader-writer lock performs well when the ratio of write acquisitions to total acquisitions is low. However it is a slower write-side lock mode than the simple test-and-set spinlock. Accordingly, a distributed reader-writer spinlock is optimal for a high quantity of read accesses with short hold times, and should be used only if less than 1 out of the number of CPUs of the accesses are write-side accesses.

A centralized reader-writer lock mode is a formative of a reader-writer lock that uses a single data structure to control access to the lock. There are many implementations of this locking primitive. One of the simplest formative uses a set of counters guarded by a simple test-and-set spinlock. The counters count the number of readers holding the lock, the number of readers waiting for access to the lock, the number of writers holding the lock (which must be either one or zero), and the number of writers waiting on the lock. The readers and writers go through a decision process based upon the counter values. Accordingly, this mode is optimal for high update rates wherein read side critical sections are lengthy.

A simple test and set primitive allows a process to request a lock by repeatedly executing instructions on a boolean flag until it successfully changes the flag from false to true. Simple test-and-set spin locks have been used for decades and are often the primitive of choice for low contention due to their extremely short code-path lengths. However, they perform poorly under high read-side contention, because they do not allow read-side acquisitions to proceed in parallel. Accordingly, the simple test-and-set mode is optimal when there are frequent write-side accesses.

Most operating systems are preprogrammed to operate in a singular reader-writer lock mode. Dynamically choosing operating modes presents a challenge in that a reactive algorithm needs to select and change modes efficiently and has to allow for the possibility that multiple processes may be executing different protocols at the same time. Frequently, the best operating mode depends on the level of contention, as well as the magnitude of the fraction of total acquisitions that are write acquisitions. In designing reactive algorithms that dynamically select among multiple synchronization protocols several issues must be addressed, including: how the algorithm efficiently detects which modes to use, how the algorithm changes modes correctly and efficiently, and when the algorithm should change protocols. Accordingly, in providing efficient mechanisms for a dynamic protocol selection that multiple processes may be trying to execute, the main considerations are execution of the synchronization operation and maintaining constant agreement as to which protocol to use without incurring significant overhead.

Each of the implementations of reader-writer locks and the exclusive test-and-set spinlock described herein and known in the art are optimal under different operation conditions. For example, a distributed reader-writer spinlock works best under highly read-intensive workloads, a centralized reader-writer spinlock works best under moderately read-intensive workloads with large read-side critical sections, and a simple test-and-set spinlock works best under write-intensive workloads. It is known in the art, that the programmer using a locking mode must select the locking mode to be implemented when coding. Accordingly, if the workload shifts to different operating conditions, the single locking algorithm pre-selected can become non-optimal.

Figure 4:
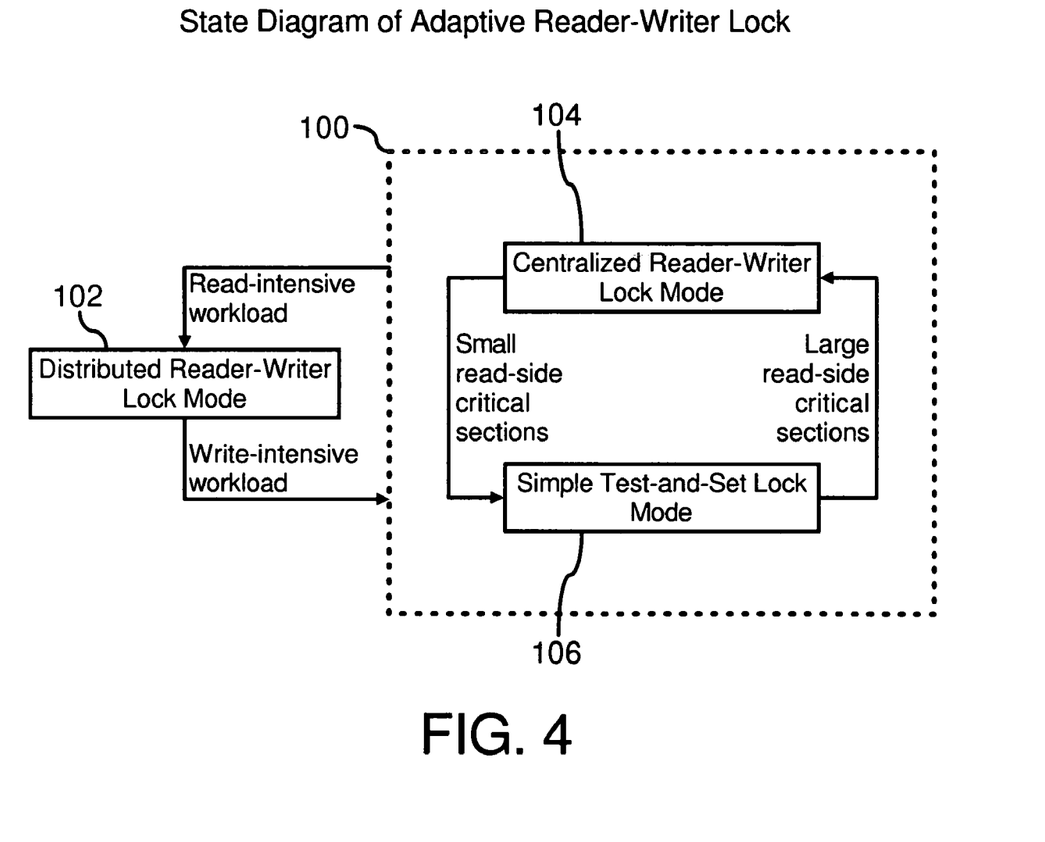
FIG. 4 is a flow chart illustrating selection of an optimal locking mode of operation.

FIG. 4 is a flow chart (100) illustrating the path followed for dynamically selecting a reader-writer lock mode in a multiprocessor. As described above, there are three general forms of a reader-writer lock mode, a distributed reader-writer lock mode (102), a centralized reader-writer lock mode (104), and a simple test-and-set lock mode (106). Each of these operating modes are beneficial and more efficient under different operating conditions. The essence of the method herein is to ascertain which locking mode is a more efficient mode under different operating conditions and switching to that optimal mode under specific operating conditions.

Figure 5:
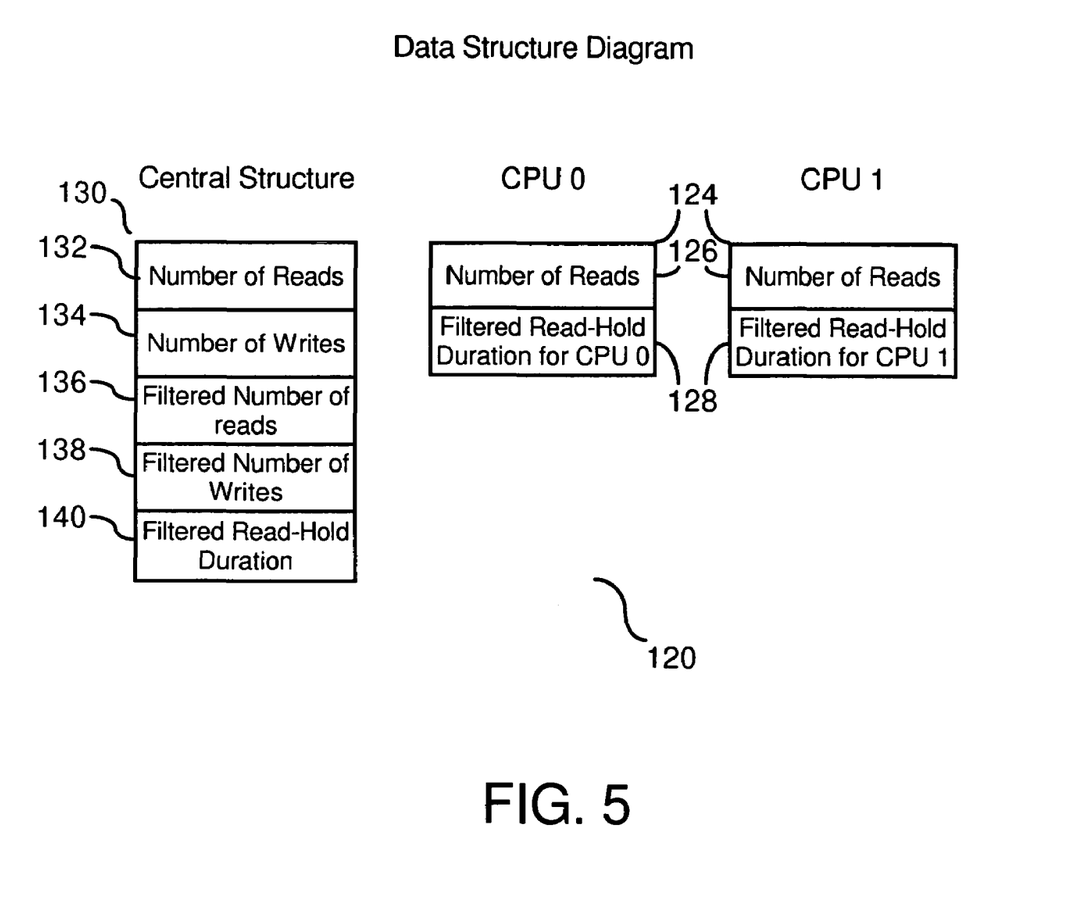
FIG. 5 is a data structure diagram of the system measurements.

There are different measurements acquired to determine when it is desirable to switch among operating modes. FIG. 5 is a diagram (120) illustrating the different measurements that are acquired and where they are stored. Each CPU (124) in the system maintains a measure of the quantity of read-side acquisitions (126) of that CPU. In addition, each CPU maintains a measure of the read-hold duration (128) for that CPU. The measure (126) may be in the form of a counter, or an alternative measurement for maintaining the quantity of read-side acquisitions on each CPU. In an alternative embodiment, information is collected by a unit within a computer processing system, wherein the unit may be in the form of a thread, a process, a transaction, a co-routine, a thread in a multi-threaded architecture, and a task, and the counters measure read-side and read-hold duration by the appropriate unit. The read-hold duration (128) may be in the form of a digital filter, or an alternative mathematical algorithm. The digital filter may compute a weighted average, a sliding window average, a finite impulse response, and alternative computational operations that adjust the ability to respond to current events as opposed to historic events of the operating mode. External to the per-CPU measurements is a central data structure (130) which operates as a central location for storing system wide measurements and maintaining a system wide accounting. The central data structure maintains information for a measurement of the quantity of read-side acquisitions in the system (132) and the quantity of write-side acquisitions in the system (134). In addition, the central data structure (130) maintains a measurement of the read and write acquisitions (136) and (138), respectively, and a measurement of read-hold durations (140). Accordingly, the measurements maintained in each CPU, (126) and (128), and the measurements maintained in the central data structure (132)-(140) are used to compute and determine an optimal operating mode for the operating system and to enhance efficiency for switching among operating modes.

The central measure of read acquisitions (136) may be in the form of a digital filter, or an alternative mathematical algorithm, that contributes to the accuracy of calculating the optimal operating mode. The measure (136) in the form of a digital filter is a computational means for determining recent events in the quantity of read-hold acquisitions in the system. The digital filter may compute a weighted average, a sliding window average, a finite impulse response, and alternative computational operations that adjust the ability to respond to current events as opposed to historic events of the operating mode.

The central measure of write acquisitions (138) may also be in the form of a digital filter, or an alternative mathematical algorithm, that contributes to the accuracy of calculating the optimal operating mode. The measure (138) in the form of a digital filter is a computational means for determining recent events in the quantity of write-hold acquisitions in the system. The digital filter may compute a weighted average, a sliding window average, a finite impulse response, and alternative computational operations that adjust the ability to respond to current events as opposed to historic events of the operating mode. The central data structure does not store information pertaining to the write-hold per CPU. The write-hold requires a manipulation of the central data structure regardless of the operating mode. Therefore, it is only necessary to store such information in the central data structure.

Finally, the central data structure stores and maintains a measurement of the read-hold duration (140). This measure computes a time interval for which the CPUs in the system are using read-holds. The measure (140) may come in the form of a digital filter, which may be a weighted average, a sliding window average, a finite impulse response, or an alternative computations operation that adjust the ability to determine the centralized reader-write lock mode (104) and the simple test-and-set lock mode (106) for acquiring a write lock. Accordingly, the read-hold duration measure is used to determine an optimal and efficient time for switching between the two operating modes that are desirable for write-hold modes.

When a CPU in the system write-acquires the lock, the CPU measure of read-side acquisitions (126) and the quantity of read-side acquisitions are applied to the measure (132) in the central data structure and the CPU measure (126) is reset to zero. A measure of write-side acquisitions (134) is maintained by a discrete unit of information, which is periodically updated. In a preferred embodiment, the update method may be a computer implemented algorithm or computer code. At such time as the measure (132) of read-side acquisitions in the central data structure (130) is sufficiently greater than the measure (134) of write-side acquisitions, and if the lock mode is operating outside of the distributed reader-writer lock mode (102), then the lock mode switches into the distributed reader-writer lock mode (102). The transfer into this mode (102) is illustrated in FIG. 4. As shown in FIG. 4, both the centralized reader-writer lock mode (104) and the simple test-and-set lock mode (106) are desirable for write intensive workloads. However, at such time as the measure of read acquisitions exceeds the measure of write acquisitions, it may be desirable to switch to a distributed reader-write lock mode for more efficient operation. If the system were already operating in a distributed reader-writer lock mode, then it would remain in this mode until such time as it is determined optimal to switch to an alternative lock mode to enhance operating efficiency. However, regardless of which locking mode the system is operating under and which mode it may be optimal to switch to, a lock must be held on the central lock state before a switching of lock modes may occur. This prevents two CPUs from attempting to switch states at the same time. The lock on the central lock is held during any acquisition and release for the simple test-and-set spinlock and the centralized reader-writer lock modes, and for write acquisition and release for the distributed reader-writer lock mode.

Having defined all of the measurement maintained by each CPU and the central data structure, these measurements may now be mathematically manipulated to determine optimal times to switching operating modes. The following terms define the measurements and mathematics employed: $D_r$ is the measure of duration of read acquisitions, $n_r$ is the measure of read acquisitions, $n_c$ is the number of CPUs in the system, $n_w$ is the measure of the number of write acquisitions, $d_r$ is $D_r/n_r$, f is $n_w/(n_r+n_w)$, $t_f$ is the threshold for f shown as $(1/(2*n_c))$, $t_D$ is the threshold for the accumulated duration of read acquisitions shown as one half of a CPU over a period of time, $L_m$ is the amount of time it takes for a memory request to be satisfied given that memory requested was recently modified by another CPU, i.e. memory latency, and $t_d$ is the threshold for $d_r$, defined as $L_m*5$.

If the system lock mode is operating in a distributed reader-writer lock mode (102), it is presumed that the system is operating under a significant quantity of read-side acquisitions, and will switch from this mode to an alternate mode when servicing a write-side access. At such time as $f>t_f$, then it may be optimal to switch to either the centralized reader-writer lock mode (104) or the simple test-and-set spinlock mode (106). The transfer into the centralized reader-writer lock mode (104) or the simple test-and-set spinlock mode (106) is illustrated in FIG. 4. As shown in FIG. 4, both the centralized reader-writer lock mode (104) and the simple test-and-set lock mode (106) are desirable for write intensive workloads, and the distributed reader-writer lock mode is desirable for read intensive workloads. Accordingly, the preferred embodiment considers switching from a distributed reader-writer lock mode (102) only when servicing a write-side access.

If the system is operating in a centralized reader-writer lock mode (104), it may be desirable to switch to another operating mode under certain conditions and circumstances. For example, if $f<t_f$, it may be desirable to switch to a distributed reader-writer lock mode (102). Alternatively, if $d_r<t_d$ or if $D_r<t_D$ then it may be desirable to switch to a simple test-and-set spinlock. Finally, if the system is operating under the simple test-and-set spinlock mode, it may be desirable to switch to another operating mode under certain conditions and circumstances. For example, if $f<t_f$, then it may be desirable to switch to a distributed reader-writer lock mode. However, if $d_r>t_d$ and $D_r>t_D$, then it may be desirable to switch to a centralized reader-writer lock mode. Accordingly, the process of switching operation modes is based upon mathematical evaluations from the values stored and defined in each CPU as well as the central data structure, as shown in FIG. 5.

In an alternative embodiment, the system may only have the option of switching between a distributed reader-writer lock mode and a centralized lock, wherein the centralized lock may be a simple test-and-set spinlock or a centralized reader-writer lock. If the system is operating in a distributed reader-writer lock, write-side access has been requested, and $f>t_f$, then it may be desirable to switch to a centralized lock mode. However, if the system is operating in a centralized lock mode and $f<t_f$, then it may be desirable to switch to a distributed reader-writer lock mode. When operating between the two modes noted herein, the mathematical formulae are less complex. However, the price of simplicity is less-optimal performance under some workloads.

FIG. 4 is a flow chart illustrating how the system switches among operating modes when it is determined that switching would provide more optimal operating conditions. As shown in FIG. 4, if the system is operating in a distributed reader-writer lock mode (102), it may be desirable to switch to another operating mode when write-side acquisitions exceed a minimum threshold. For example, if the measure of write acquisitions is greater than one from a total of write acquisitions, then the desirable operating mode is the centralized reader-writer lock mode (104). However, if the system is operating in a centralized reader-writer lock mode (104), it may be desirable to switch to a simple test-and-set lock mode (106) when the read-hold duration measure is below a defined threshold. Alternatively, if the system is operating in a centralized reader-writer lock mode (104) and the read-hold measure exceeds a defined threshold, it is desirable to switch to a distributed reader-writer lock mode (102). Accordingly, the dynamic locking primitive utilizes predefined parameter for determining optimal switching opportunities.

Figure 6:
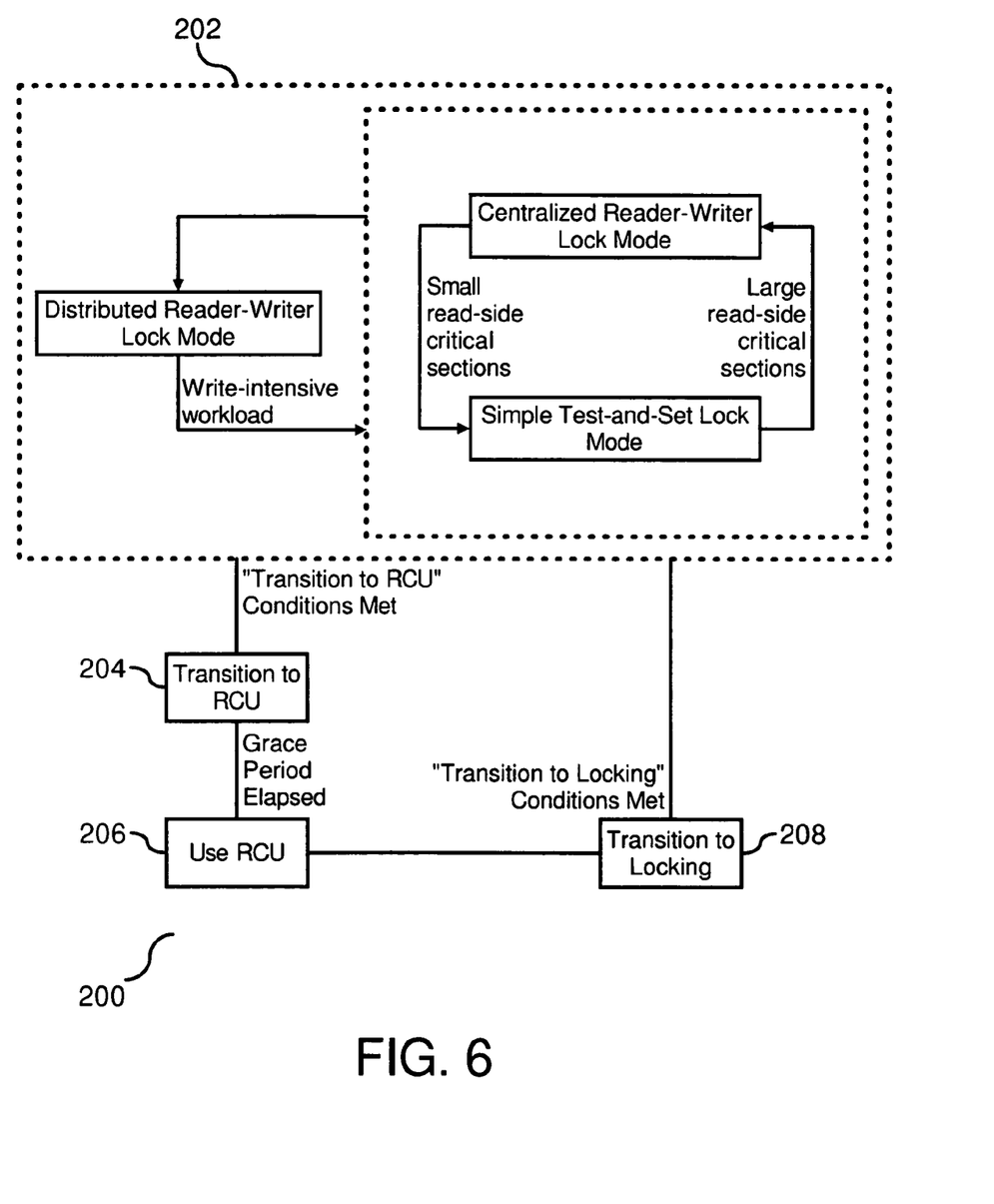
FIG. 6 is a block diagram illustrating transition among modes of operation and selection of an optimal mode of operation according to the preferred embodiment of this invention, and is suggested for printing on the first page of the issued patent

In addition to switching among lock modes, it may become desirable to employ the RCU mechanism in situations where conditions indicate that an RCU mode is the optimal mode of operation. FIG. 6 is a flow diagram (200) illustrating transitioning between Use Locking mode (202) and RCU mode (206). As shown in this example, there are two primary modes of operation, Use Locking (202) and RCU (206), and two transition modes of operation, Transition from Use Locking to RCU (204) and transition from RCU to Use Locking (208). Examples of lock modes that may be employed in the Use Locking mode include: distributed reader-writer lock mode, centralized reader-writer lock mode, and simple test-and-set lock mode. In any of the three modes both readers and writers must acquire locks to access the protected data structure. Writers need not defer destruction. Instead, writers may immediately free any memory that has been removed from the data structure.

It may be desirable for a data structure in the use locking mode (202) to transition to the RCU mode (206) via the transition mode (204) if one or more of the following conditions hold:

1. Write operations are significantly less frequent than read operations. For example, if write operations are less than 1/50n of the read operations, where n is the number of CPUs in the system.
2. The typical interval between successive write operations is short compared to the duration of a typical grace period. For example, if there is typically at least 2n write operations occurring during each grace period, where n is the number of CPUs in the system.
3. There is ample memory available.
4. There are no executable real-time tasks in the system or the RCU implementation avoids degrading realtime response.

These conditions are illustrative and should not be considered a limited list. Other conditions might also be useful in determining when it is optimal to transition from Use Locking mode (202) to RCU mode (206). While in the Transition to RCU mode (204), both readers and writers must acquire locks, and writers must defer destruction via the call_rcu( ) or synchronize_kernel( ) primitives. The data structure remains in this mode for a full grace period, which ensures that all writers have started deferring destruction before the Use RCU state (206) is entered.

In the Use RCU mode (206), only writers need acquire locks, as readers proceed without locking. Writers must defer destruction using the $call_{13}rcu( )$ or synchronize_kernel( ) primitives. This deferral is required to prevent updates to the data structure made by writers from interfering with concurrent readers. A data structure in the Use RCU mode (206) might transition to the Use Locking state (202) via the Transition to Locking mode (208). The following is a list of conditions of which a combination of some of the conditions must be met in order to determine when to transition from the Use RCU mode (206) to the Use Locking mode (202):

1. Writers are relatively frequent compared to readers. For example, an implementation might check to see if more then 1/50n of the accesses to the data structure are write operations, where n is the number of CPUs in the system. The exact comparison may depend on the data structure and the workload.
2. The typical interval between successive write operations is long compared to the duration of a typical grace period.
3. Memory is in short supply.
4. There is at least one runnable real-time task present in the system.

These conditions are merely examples of determining when it may be optimal to transitions from Use RCU mode (206) to Use Locking mode (202). Other implementations for determining optimal transition opportunities may include the use of digital filters or similar techniques to avoid spurious transitions that might otherwise be caused by short-term fluctuations.

While in the Transition to Locking mode (208), both readers and writers must acquire locks. Furthermore, writers must defer destruction of elements removed from the data structure via the $call_{13}rcu( )$ or synchronize_kernel( ) primitives. The data structure remains in the Transition to Locking mode (208) for a full grace period to ensure that all readers have started acquiring locks before the Use Locking mode (202) is entered. Accordingly, the data structure may transition among different modes of operation in response to a change in conditions associated with the readers and/or writers.

Advantages Over The Prior Art

It is known in the art to implement an adaptive exclusive lock for an operating system. In the prior art, the operating mode may switch between a simple test-and-set spinlock and a queued lock. Both of these are exclusive locking modes and do not address a dynamic lock primitive for reader-writer spinlocks. However, the method of dynamically switching among lock modes for an operating system allows the system to switch tinder optimal conditions to provide an efficient use of time and memory. There is overhead involved with conducting a switch, and as such switching among nodes should only be induced when it has been determined to be optimal to provide a more efficient operation.

Alternative Embodiments

It will be appreciated that, although specific embodiments of the invention have been described herein for purposes of illustration, various modifications may be made without departing from the spirit and scope of the invention. In particular, the system maintains and calculates secondary measurements for use in determining optimal modes of operation and an optimal opportunity for switching to an alternative locking mode. The secondary measurements come in alternative forms depending upon the needs ascertained. For example, it may be desirable to utilize a digital filter for such measurements. Alternatively, a weighted average or another statistical format may be desirable for determining accurate secondary measurements. In addition, for data structures that allow only one update at a time and where only the updater is permitted to change the locking state, the updater may switch directly from the Use Locking mode (202) to the Use RCU mode (206) without entering the Transition to RCU mode (204). This direct transition is permissible where there is only one updater to the data structure since the next updater would be guaranteed to see the new mode. In addition, the method may be applied to a computer system and article of manufacture for use with the method of dynamically selecting among locking modes. Some systems and workloads may require separate thresholds be used to determine when to switch from versus to a given lock mode in order to provide hysteresis. Accordingly, the scope of protection of this invention is limited only by the following claims and their equivalents.

I claim:

1. A method for dynamically determining a synchronization mechanism of a data structure in a multiprocessor, comprising:
    maintaining first and second system-wide measures of read and write acquisitions;
    determining said synchronization mechanism based upon at least some of said measures;
    acquiring said synchronization mechanism for a first processing unit responsive to said determination; and
    releasing said synchronization mechanism responsive to a change in at least some of said system-wide measures of read and write acquisitions, wherein the step of releasing said synchronization mechanism includes switching said first processing unit to a different synchronization mechanism.

2. The method of claim 1, wherein said synchronization mechanism is selected from the group consisting of: a distributed reader-writer lock-, a centralized reader-writer lock, an exclusive lock, and RCU.

3. The method of claim 2, wherein said exclusive lock mode is selected from the group consisting of: a test and set lock mode, a test and test and set lock mode, a queued lock mode, a ticket lock mode, and a quad-aware lock mode.

4. The method of claim 1, further comprising switching to a synchronization mechanism from another synchronization mechanism.

5. The method of claim 1, wherein the synchronization mechanism is a distributed reader-writer lock mode, and wherein said determining step is responsive to the system-wide measure of write acquisitions and the system-wide measure of read acquisitions.

6. The method of claim 5, wherein said determining step is further responsive to a quantity of units in the system.

7. The method of claim 6, wherein said unit is selected from a group consisting of: a CPU, a thread, a processor, a transaction, a co-routine, a thread in a multi-threaded architecture, a NUMA module, and a task.

8. The method of claim 1, wherein the synchronization mechanism is a centralized lock mode, and wherein said determining step is responsive to the system-wide measure of write acquisitions and the system-wide measure of read acquisitions.

9. The method of claim 1, further comprising maintaining a system-wide measure of read-hold duration.

10. The method of claim 9, wherein the step of maintaining a system-wide measure of read-hold duration includes maintaining a measure of read-hold duration by a unit.

11. The method of claim 10, wherein said unit is selected from a group consisting of:
    a CPU, a thread, a processor, a transaction, a co-routine, a thread in a multi-threaded architecture, a NUMA module, and a task.

12. The method of claim 9, wherein the synchronization mechanism is a centralized lock mode, and wherein said determining step is responsive to the system-wide measures of read acquisitions and read-hold duration.

13. The method of claim 9, wherein the synchronization mechanism is an exclusive lock mode and wherein said determining step is responsive to the system-wide measure of read-hold duration.

14. The method of claim 13, wherein said determining step is further responsive to the system-wide measure of read acquisitions.

15. The method of claim 1, further comprising periodically updating at least some of said system-wide measures.

16. The method of claim 1, wherein at least some of said second system-wide measures are selected from a group consisting of: a digital filter, a weighted average, a sliding window average, a finite impulse response, and a central data structure.

17. A method for dynamically determining a synchronization mechanism of a data structure in a multiprocessor, comprising:
    maintaining first and second system-wide measures of read and write acquisitions; and
    determining said synchronization mechanism based upon at least some of said measures, wherein said synchronization mechanism is selected from the group consisting of: a distributed reader-writer lock, a centralized reader-writer lock, an exclusive lock, and RCU.

* * * * *